(12) United States Patent
Jeon et al.

(10) Patent No.: US 7,899,115 B2
(45) Date of Patent: Mar. 1, 2011

(54) METHOD FOR SCALABLY ENCODING AND DECODING VIDEO SIGNAL

(75) Inventors: Byeong Moon Jeon, Seoul (KR); Seung Wook Park, Seoul (KR); Ji Ho Park, Seoul (KR); Doe Hyun Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/918,441

(22) PCT Filed: Apr. 14, 2006

(86) PCT No.: PCT/KR2006/001388
§ 371 (c)(1),
(2), (4) Date: Oct. 10, 2008

(87) PCT Pub. No.: WO2006/110013
PCT Pub. Date: Oct. 19, 2006

(65) Prior Publication Data
US 2009/0067502 A1 Mar. 12, 2009

(30) Foreign Application Priority Data
Nov. 30, 2005 (KR) .................. 10-2005-0115577

(51) Int. Cl.
*H04N 11/04* (2006.01)
(52) U.S. Cl. .................. 375/240.1; 375/240.24
(58) Field of Classification Search ............. 375/240.01, 375/240.12, 240.16, 240.21, 240.24, 240.29
See application file for complete search history.

(56) References Cited

U.S. PATENT DOCUMENTS

| | | | | |
|---|---|---|---|---|
| 5,821,986 | A | * | 10/1998 | Yuan et al. ................. 348/14.12 |
| 6,057,884 | A | * | 5/2000 | Chen et al. ................ 375/240.16 |
| 6,510,177 | B1 | | 1/2003 | De Bonet et al. |
| 6,614,428 | B1 | | 9/2003 | Lengyel |

(Continued)

FOREIGN PATENT DOCUMENTS

EP 0890923 A2 1/1999

(Continued)

OTHER PUBLICATIONS

D.S. Turaga et al.: "Reduced complexity spatio-temporal scalable motion compensated wavelet video encoding" 2003 International conference on multimedia and expo, vol. 2, Jul. 6-9, 2003, pp. 561-564.

(Continued)

*Primary Examiner* — Huy T Nguyen
(74) *Attorney, Agent, or Firm* — Harness, Dickey & Pierce, P.L.C.

(57) ABSTRACT

The present invention relates to a method for scalably encoding and decoding a video signal. In an embodiment of the present invention, motion information, such as reference indices, motion vector, modes, etc., for an enhanced layer can be derived from a base layer, and a reference index for an image block in the enhanced layer is determined using median criterion based upon the base layer. A reference index for a block, having the most pixels corresponding to those of the image block, in the base layer is selected as the reference index for the image block, and the nearer reference index is selected if more than one block in the base layer have the same pixels corresponding to those of the image block. And, a motion vector for the base layer block related to the selected reference index is selected as the motion vector for the image block.

2 Claims, 4 Drawing Sheets

U.S. PATENT DOCUMENTS

| | | | |
|---|---|---|---|
| 2001/0031003 | A1 | 10/2001 | Sawhney et al. |
| 2002/0037047 | A1 | 3/2002 | Van Der Schaar et al. |
| 2002/0150158 | A1 | 10/2002 | Wu et al. |
| 2003/0138043 | A1 | 7/2003 | Hannuksela |
| 2006/0013306 | A1 | 1/2006 | Kim et al. |
| 2006/0153295 | A1* | 7/2006 | Wang et al. ............... 375/240.08 |
| 2006/0268991 | A1* | 11/2006 | Segall et al. ............. 375/240.24 |

FOREIGN PATENT DOCUMENTS

| | | |
|---|---|---|
| EP | 1 479 245 | 7/2003 |
| EP | 1 659 797 | 5/2006 |
| KR | 10-2006-0043115 | 5/2006 |
| RU | 2001123542 A | 11/2000 |
| RU | 2201654 | 3/2003 |
| WO | WO 03/063505 | 7/2003 |

OTHER PUBLICATIONS

Notice of Allowance issued Apr. 10, 2009 by the Korean Patent Office in counterpart Korean Patent Application No. 10-2005-0115577.

Russian Office Action dated Dec. 4, 2009 for corresponding Application No. 2007142185.

Xiong, Lianhuan et al., "Improving enhancement layer intra prediction", Joint Video Team (JVT) of ISO/IEC MPEG & ITU-T VCEG, JVT-0029, 15$^{th}$ Meeting: Busan, KR, Online Apr. 14, 2005.

Reichel, Julien et al., "Joint Scalable Video Model JSVM 0", Joint Video Team (JVT) of ISO/IEC MPEG & ITU-T VCEG, JVT-N021, 14$^{th}$ Meeting: Hong Kong. CN, Jan. 17-21, 2005.

Russian Office Action dated Jun. 21, 2010 for corresponding Application No. 2007142185.

Iain Richardson, "H.264 and MPEG-4 Video Compression. Video Coding for Next Generation", 2003.

Peng Yin et al., "Technical description of the Thompson proposal for SVC CE7—spatial intra prediction on enhancement layer residue", Joint Video Team (JVT) of ISO/IEC MPEG & ITU-T VCEG, JVT-O053, 15$^{th}$ Meeting: Busan, KR, Online Apr. 14, 2005 (available at http://wftp3.itu.int/av-arch/jvt-site/2005_4_Busan/.).

Chinese Gazette for Chinese Application No. 200680017340.9 dated Oct. 20, 2010.

* cited by examiner

(a) 4x4 block b

(b) 8x8 block B

(a)

(b)

METHOD FOR SCALABLY ENCODING AND DECODING VIDEO SIGNAL

TECHNICAL FIELD

The present invention relates, in general, to methods of scalably encoding and decoding video signals and, more particularly, to methods that encode and decode an enhanced layer by deriving motion information from a base layer.

BACKGROUND ART

It is difficult to assign wide bandwidth, such as the bandwidth required for television (TV) signals, to digital video signals that are transmitted in a wireless manner through mobile phones or notebook computers, which are currently widely used, or through mobile TVs or hand-held Personal Computers (PCs), which will be widely used in the future. Therefore, a standard to be used in a video compression scheme for such mobile devices needs to have higher video signal compression efficiency.

Moreover, such mobile devices inevitably have varying inherent capabilities of processing or presenting video signals. Therefore, a compressed image must be variously prepared in advance to correspond to such capabilities, which means that video data having various image qualities, with respect to various combined parameters, such as the number of frames per second, the resolution, and the number of bits per pixel, must be provided for a single image source, thus inevitably placing a great burden on content providers.

For this reason, a content provider prepares compressed video data having a high bit rate for each individual image source, and, when the mobile device requests the video data, performs a procedure of decoding a compressed image and encoding the decoded image into video data suitable for the video processing capability of the mobile device that requested the image, and then provides the encoded video data. However, such a scheme must be accompanied by a transcoding (decoding+scaling+encoding) procedure, so that a slight time delay occurs at the time of providing the image requested by the mobile device. Further, the transcoding procedure also requires complicated hardware devices and algorithms depending on the variety of encoding targets.

A Scalable Video Codec (SVC) has been proposed to overcome these obstacles. SVC is a scheme for encoding video signals at the highest image quality when encoding the video signals, and enabling image quality to be secured to some degree even though only part of the entire picture (frame) sequence generated as a result of the encoding (a sequence of frames intermittently selected from the entire sequence) is decoded.

A Motion Compensated Temporal Filter (MCTF) scheme is an example of an encoding scheme proposed for use in a scalable video codec. There is a high probability that the MCTF scheme will be applied to transmission environments such as a mobile communication environment having a limited bandwidth, therefore the MCTF scheme requires high compression efficiency, that is, high coding efficiency, in order to decrease the number of bits transmitted per second.

As described above, even if only a partial sequence of a picture sequence encoded by the MCTF, which is a scalable scheme, is received and processed, image quality can be secured to some degree. However, if the bit rate is decreased, the deterioration in image quality becomes serious. In order to solve the problem, a separate sub-picture sequence for a low bit rate, for example, small screens and/or a picture sequence having a small number of frames per second, can be provided.

A sub-picture sequence is called a base layer, and a main picture sequence is called an enhanced (or enhancement) layer. However, since the base layer and the enhanced layer are obtained by encoding the same image content with different temporal resolutions and different frame rates, redundant information (redundancy) exists in the video signals of the two layers. Therefore, in order to improve the coding efficiency of the enhanced layer, the video signal of the enhanced layer is predicted and encoded using the motion information and/or texture information of the base layer. Such an encoding method is designated as an inter-layer prediction method.

Motion information of a base layer used in the inter-layer prediction method includes reference index information that indicates a picture (frame) including a reference block, motion vector information that indicates a displacement to the reference block, partitioning information of a corresponding block (a block that is placed in the frame of a base layer, temporally coincident to the frame of an enhanced layer, including a macroblock to be encoded, and has a region covering the macroblock when the block is magnified according to the ratio of the screen size of the enhanced layer to the screen size of the base layer), etc.

FIG. 1 is a diagram showing an embodiment of a conventional method of deriving motion information of the macroblock of an enhanced layer, for example, partitioning information, reference index information, motion vector information, etc., from a base layer. In FIG. 1(a), an embodiment in which a reference index and a motion vector for a 4×4 sub-block b are derived from the base layer is shown.

First, a reference index and a motion vector for each of four corner pixels c1 to c4 of a block to be encoded can be set to a reference index and a motion vector, respectively, for the block of the base layer corresponding to each pixel.

However, when a block corresponding to each pixel does not exist in the base layer, as in the case where a temporally coincident frame does not exist in the base layer, or when a block corresponding to each corner pixel is encoded in an intra mode, the block b can be set to an intra block.

If a block corresponding to the corner pixel does not use a frame existing in a reference picture list List_0, the frame existing in List_0 and a motion vector directed toward the frame in List_0 are not set in the block b. This is equally applied to List_1.

A reference index rb(List_x) for the block b is set to a minimum value of reference indices rci(List_x), determined for respective corner pixels, and a motion vector mvb (List_x) for the block b is set to the mean of the motion vectors of the corner pixels having the set reference index rb(List_x).

In FIG. 1(b), an embodiment in which motion information of an 8×8 block B is derived from 4×4 sub-blocks is shown.

In the case where all four 4×4 sub-blocks are intra blocks, the 8×8 block B is set to an intra block. In other cases, the reference index information and partitioning information of the 8×8 block B are determined through the following procedure.

For respective 4×4 sub-blocks, reference indices for reference picture lists List_0 and List_1 are set to the same values. Description is made using List_0 as an example, and the same operation is performed on List_1.

In the case where no 4×4 sub-block uses a frame in List_0, the reference index and the motion vector for List_0 are not set for the 8×8 block B.

In other cases, a reference index rB(List_0) for the 8×8 block B is calculated as the minimum value of the reference indices for the four 4×4 sub-blocks. The mean motion vector mvmean(List_0) of the 4×4 sub-blocks having the calculated reference index rB(List_0) is calculated. Further, in the 4×4 sub-blocks, a reference index and a motion vector for each of i) an intra block, ii) a block not using List_0, or iii) a block having a reference index rb(List_0) other than the calculated reference index rB(List_0), are forcibly set to the calculated reference index rB(List_0) and the calculated motion vector mvmean(List_0), respectively.

Thereafter, the partitioning mode for the 8×8 block B is determined as follows. If the motion vectors of two neighboring 4×4 sub-blocks are equal to each other, the sub-blocks are considered to be equal to each other, and are then combined with each other. In FIG. 1(b), if sub-blocks b1 and b2 are equal to each other, and b3 and b4 are equal to each other, a partitioning mode is determined to be a BLK_8×4 mode. At this time, if sub-blocks b1 and b3 are also equal to each other, a partitioning mode is determined to be a BLK_8×8 mode. Similar to this, if sub-blocks b1 and b3 are equal to each other, and b2 and b4 are equal to each other, a partitioning mode is determined to be a BLK_4×8 mode. In other cases, a partitioning mode is determined to be a BLK_4×4 mode.

However, when the ratio of the screen size (or resolution) of an enhanced layer to the screen size of a base layer is not a multiple of 2 (non-dyadic case), for example, when the screen size of the base layer is ⅓, ⅔, etc. of that of the enhanced layer, it is not easy to derive motion information, such as reference index information, motion vector information, or partitioning information, from the base layer, so that an inter-layer prediction method cannot be sufficiently applied to the scalable encoding of the enhanced layer.

DISCLOSURE OF INVENTION

Accordingly, the present invention has been made keeping in mind the above problems, and an object of the present invention is to provide a method that efficiently applies an inter-layer prediction method even to a non-dyadic case so as to improve coding efficiency.

Another object of the present invention is to provide a method that derives suitable motion information from a base layer causing a screen size ratio to have a value that is not a multiple of 2, and new criteria therefor.

In accordance with one aspect of the present invention to accomplish the above objects, there is provided a method of encoding a video signal, comprising scalably encoding a video signal and generating a bit stream of a first layer, and encoding the video signal using a predetermined method, and generating a bit stream of a second layer, wherein motion information of the first layer is derived from the second layer, and a reference index for an image block in the first layer is determined using a median criterion based upon the second layer.

In accordance with another aspect of the present invention to accomplish the above objects, there is provided a method of decoding an encoded video bit stream, comprising decoding a bit stream of a first layer that has been scalably encoded and received, and decoding a bit stream of a second layer that has been encoded using a predetermined method and received, wherein motion information of the first layer is derived from the second layer, and a reference index for an image block in the first layer is determined using a median criterion based upon the second layer.

According to an embodiment of the present invention, as the reference index for the image block, a reference index for a block of the second layer, corresponding to a maximal number of pixels in the image block, may be selected, and, as the reference index for the image block, a nearer reference index may be selected if the same number of pixels corresponds to more than two blocks in the second layer. If reference indices for more than two blocks in the second layer, corresponding to the same number of pixels, are equal to each other, a motion vector having a smaller magnitude may be selected.

According to another embodiment of the present invention, as the motion vector for the image block, a motion vector for a block of the second layer, having the determined reference index, may be selected, and a motion vector having a shorter length may be selected from among motion vectors for two or more blocks if the number of blocks of the second layer having the determined reference index is two or more.

According to a further embodiment of the present invention, a reference index for each of two or more sub-blocks, constituting the image block and having the same size, may be determined using the median criterion based upon the second layer, and the reference index for the image block may be determined using the median criterion based upon the reference index for each of the sub-blocks. If two or more different reference indices are selected, a nearer reference index may be determined to be the reference index for the image block.

According to yet another embodiment of the present invention, each sub-block constituting the image block may be arbitrarily derived from a block of the second layer corresponding to the sub-block in an intra mode or an inter mode. The reference index and the motion vector for the image block may be derived from the second layer, based only on sub-blocks derived in an inter mode, other than sub-blocks derived in an intra mode

BRIEF DESCRIPTION OF DRAWINGS

The accompanying drawings, which are included to provide a further understanding of the invention, illustrate the preferred embodiments of the invention, and together with the description, serve to explain the principles of the present invention.

Features, elements, and aspects of the invention that are referenced by the same numerals in different figures represent the same, equivalent, or similar features, elements, or aspects in accordance with one or more embodiments.

MODES FOR CARRYING OUT THE INVENTION

Hereinafter, embodiments of the present invention will be described in detail with reference to the attached drawings.

Figure 1:
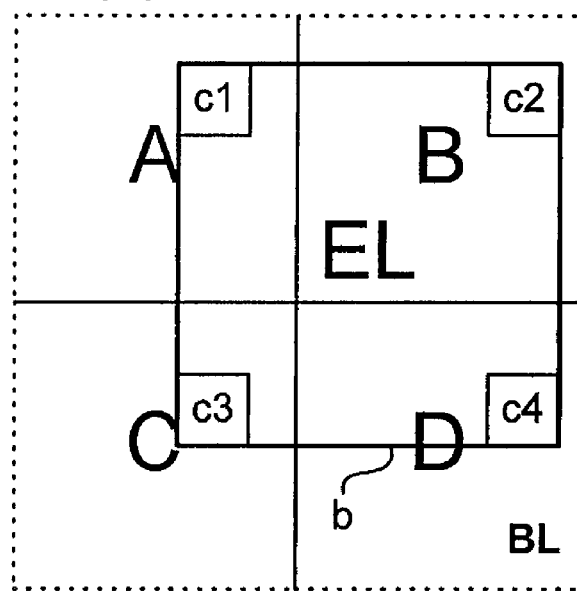
FIG. 1 is a diagram showing an embodiment of a conventional method of deriving motion information of the macroblock of an enhanced layer from a base layer.
Figure 1:
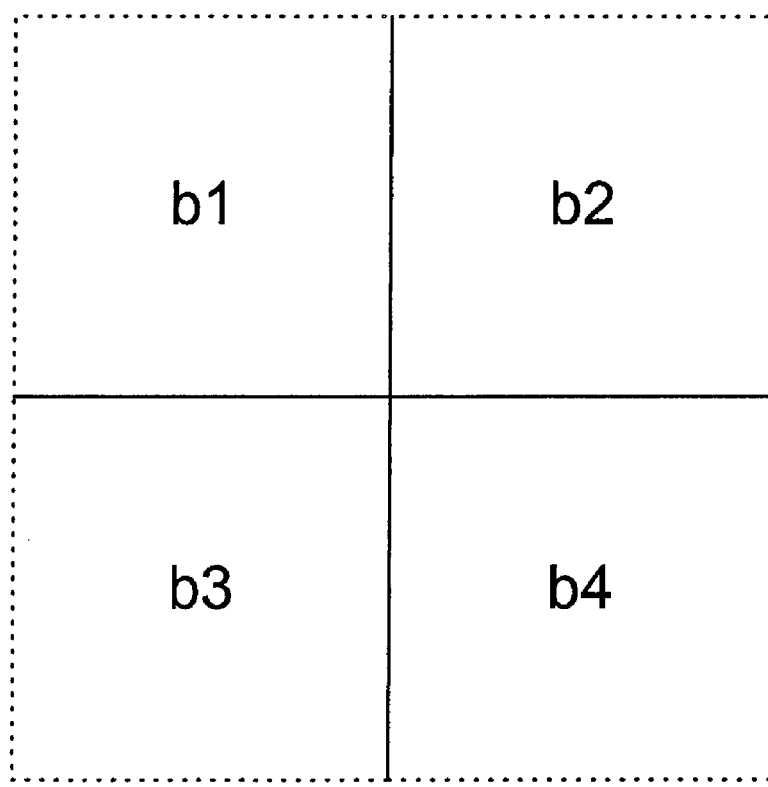
Figure 2:
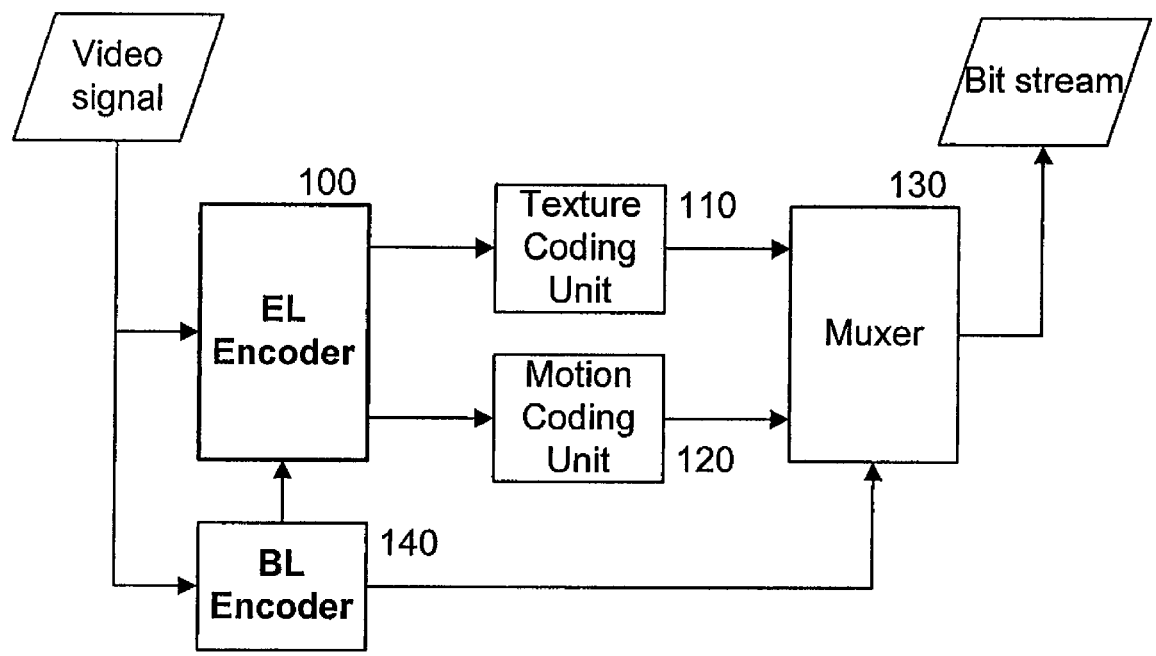
FIG. 2 is a diagram showing the construction of a video signal encoding apparatus, to which a method of scalably encoding a video signal according to the present invention is applied.

FIG. 2 is a diagram showing the construction of a video signal encoding apparatus to which a method of scalably encoding a video signal according to the present invention is applied.

The video signal encoding apparatus of FIG. 2 includes an enhanced layer (EL) encoder 100 for scalably encoding an input video signal in macroblocks using, for example, a Motion Compensated Temporal Filter (MCTF) scheme, and generating suitable management information, a texture coding unit 110 for converting data of each encoded macroblock into a compressed bit stream, a motion coding unit 120 for coding the motion vectors of image blocks, obtained by the EL encoder 100, into a compressed bit stream using a predetermined method, a base layer (BL) encoder 140 for encoding the input video signal using a predetermined method, for example, MPEG 1, 2 or 4, or H.261 or H.264, and generating a sequence of small screens, for example, a sequence of pictures having a size of 25% of an original size, or having a size of 33% of the original size in a non-dyadic case, and a multiplexer (muxer) 130 for encapsulating the output data of the texture coding unit 110, the small screen sequence of the base layer (BL) encoder 140 and the output vector data of the motion coding unit 120 in a predetermined format, multiplexing the encapsulated format data in a predetermined transmission format, and outputting the data in that transmission format.

The EL encoder 100 performs a prediction operation of subtracting a reference block, obtained through motion estimation, from a macroblock in an arbitrary video frame (or picture), and can perform an update operation of selectively adding the image difference between the macroblock and the reference block to the reference block.

The EL encoder 100 can separate an input video frame sequence into frames that will have an image difference and the remaining frames (or frames to which the image difference is selectively added), for example, odd-numbered frames and even-numbered frames, and can perform a prediction operation and/or an update operation over several temporal decomposition levels, for example, until a temporal decomposition level at which a single high frequency frame (frame generated through a prediction operation, 'H' frame) and a single low frequency frame (frame generated through an update operation, 'L' frame) are generated with respect to a single Group Of Pictures (GOP).

The EL encoder 100 performs a procedure of dividing a frame, which will have an image difference, of the input video frames or the low frequency frames obtained at a previous temporal decomposition level, into macroblocks each having a predetermined size, detecting a block having an image most similar to that of each divided macroblock, in previous and subsequent frames or in its own frame, generating a predicted image, and obtaining motion vectors. The EL encoder 100 performs the above procedure on all macroblocks in the frame, thus completing a high frequency frame that is a predicted image for the corresponding frame.

Alternatively, the EL encoder 100 can detect a reference block for a macroblock from the frame of the base layer using an intra-BL prediction method. In this case, the EL encoder 100 can detect a corresponding block encoded in an intra mode in a temporally coincident frame of the base layer, generated by the BL encoder 140 (the corresponding block is placed in the frame of the base layer temporally coincident to a frame having the macroblock, and has a region covering a current macroblock when the block is magnified according to the ratio of the screen sizes of the enhanced layer to the base layer), thus generating a predicted image.

Further, as described above, the EL encoder 100 can not only encode the macroblock of the enhanced layer using image data (texture) of the base layer through an intra BL prediction method, but can also encode the macroblock of the enhanced layer on the basis of motion information, such as a mode, a reference index or a motion vector for the corresponding block of the base layer.

Further, the EL encoder 100 performs an update operation on each macroblock in a frame, to which an image difference will be added, of the input video frame or the low frequency frames obtained at a previous temporal decomposition level, of adding, to the macroblock, a corresponding region in the frame encoded to have an image difference via the prediction operation performed based on part or all of a region of the macroblock, if necessary. In this case, motion information of the macroblock to be updated is derived from the corresponding block of the base layer, so the macroblock can be updated based on the motion information. The EL encoder 100 performs the above operation on all of the macroblocks of the frame, thus completing a low frequency frame for the corresponding frame.

The method of deriving motion information, such as partitioning information, reference index information or motion vector information of the macroblock of the enhanced layer, from a base layer during a prediction procedure and/or an update procedure according to the present invention is described in detail.

Figure 3:
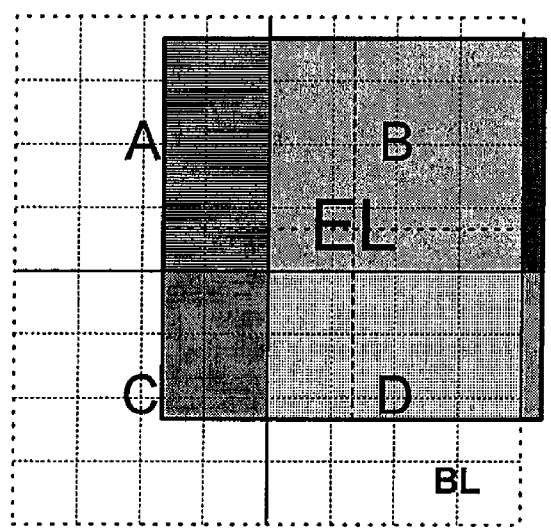
FIG. 3 is a diagram showing an embodiment of a method of deriving a reference index and a motion vector for 4×4 sub-blocks from a base layer according to the present invention.

An embodiment of the method of deriving a reference index and a motion vector for each 4×4 sub-block from the base layer is described with reference to FIG. 3. In order to determine a reference index, a median criterion is used.

The block of a base layer corresponding to each pixel in the 4×4 sub-block of the enhanced layer is determined. A reference index for the block of the base layer corresponding to a maximal number of pixels is selected as a reference index for the 4×4 sub-block of the enhanced layer. In this case, if the same number of pixels corresponds to two blocks of the base layer, the nearer reference index is selected. If the reference indices for the two blocks are equal to each other, a motion vector having a smaller magnitude can be selected.

As a motion vector, a motion vector for the block of the base layer, having the selected reference index, is selected. If the number of blocks of the base layer, having the selected reference index, is two or more, a motion vector having the shorter length can be selected from among the motion vectors of the two or more blocks.

Figure 4:
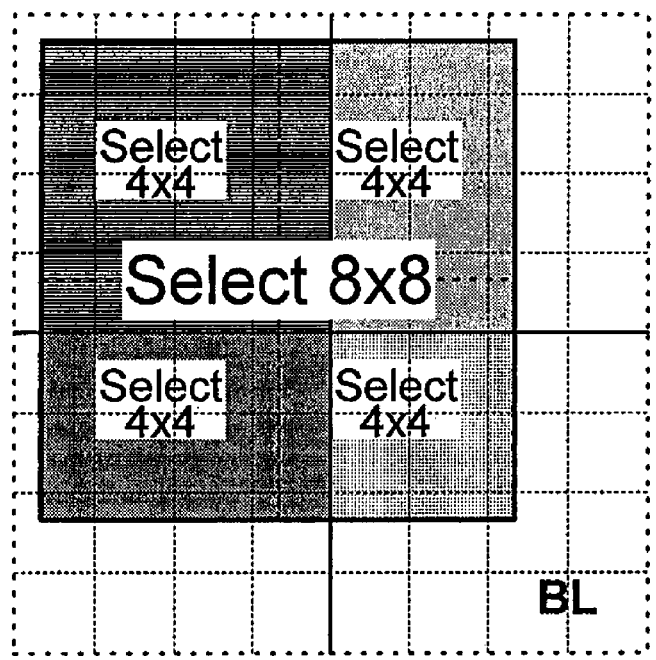
FIG. 4 is a diagram showing an embodiment of a method of deriving a reference index and a motion vector for an 8×8 block from a base layer according to the present invention.
Figure 4:
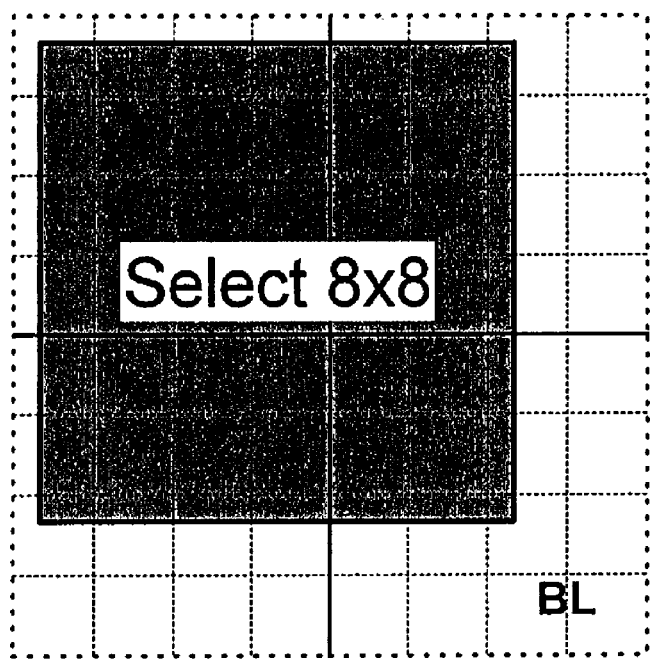

An embodiment of a method of deriving a reference index and a motion vector for an 8×8 block is described with reference to FIG. 4. Similarly, a median criterion is also used to determine a reference index.

First, as shown in FIG. 4(a), reference indices and motion vectors for four 4×4 sub-blocks are obtained according to the above embodiment of the present invention. An optimal reference index and an optimal motion vector can be obtained from the reference indices and the motion vectors for the four sub-blocks.

As another method, an optimal reference index can be selected from among the reference indices for the blocks of the base layer corresponding to the 8×8 block, instead of selecting the candidates of a reference index and a motion vector for the 8×8 block from the 4×4 sub-blocks, for which the reference indices and the motion vectors are first obtained. Similar to the case of the 4×4 sub-blocks, the reference index that is most frequently used can be selected from among usable reference indices.

For example, as shown in FIG. 4(b), for each pixel belonging to the 8×8 block, the reference index for the block of the base layer, corresponding to the pixel, is connected as the reference index for the corresponding pixel, and the reference index connected to a maximal number of pixels can be selected as the reference index for the 8×8 block.

In this case, if two or more different reference indices are selected for the 8×8 block, the nearer reference index is determined to be the reference index for the 8×8 block.

Figure 5:
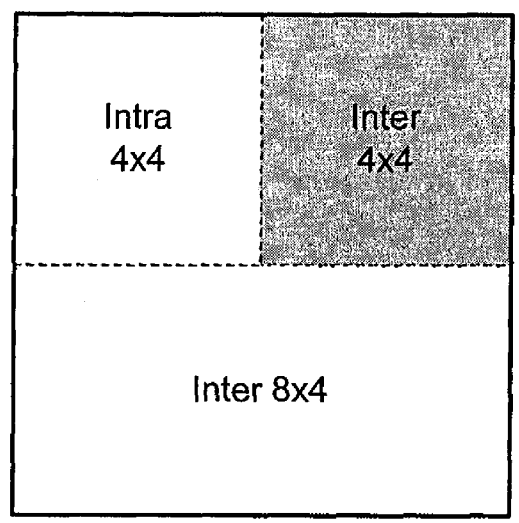
FIG. 5 is a diagram showing an embodiment of a method of deriving a mode for an 8×8 block from a base layer according to the present invention.

Meanwhile, when the mode of the 8×8 block is derived from the base layer, an N×N intra sub-block mode and an N×N inter sub-block mode coexist within the 8×8 block. Therefore, in the present invention, as shown in FIG. 5, the mode of the 8×8 block, composed of a 4×4 intra mode, a 4×4 inter mode, and an 8×4 inter mode, can also be derived. In this case, a conventional method can be applied to the combination of the blocks.

If the mode of the 8×8 block is derived and determined, a single reference index is selected on the basis only sub-blocks derived in an inter mode, other than 4×4 sub-blocks derived in an intra mode in the 8×8 block, according to the above-described method.

A data stream encoded by the above-described method may be transmitted to a decoding apparatus in a wired or wireless manner, or may be transmitted through a recording medium. The decoding apparatus reconstructs an original video signal according to a method which will be described later.

Figure 6:
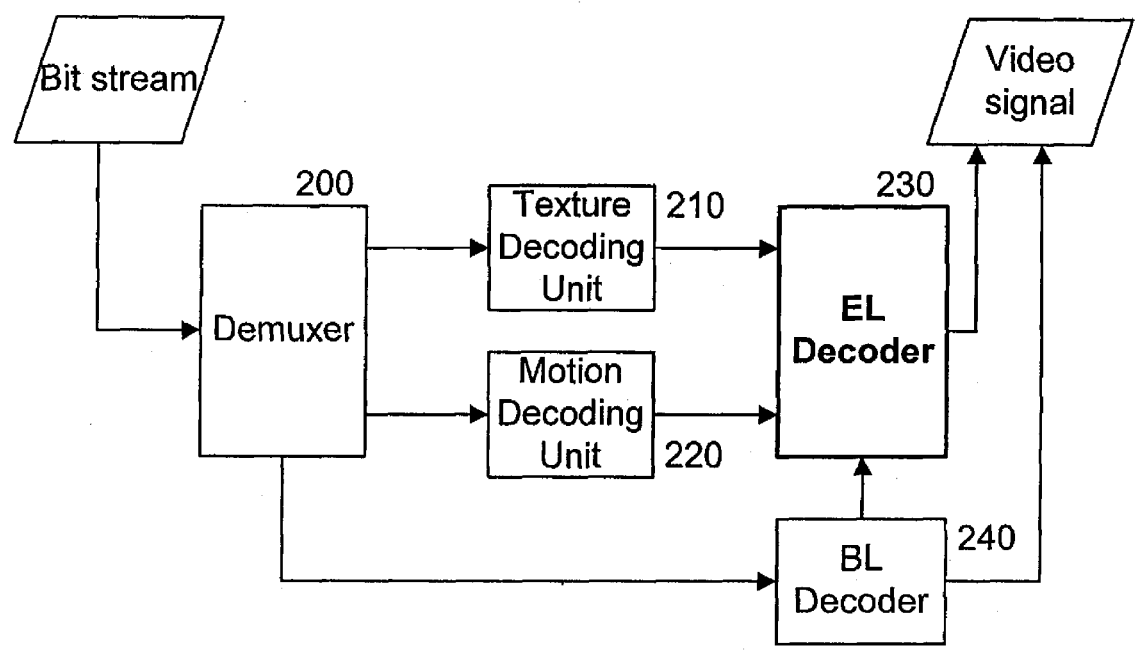
FIG. 6 is a diagram showing the construction of an apparatus for decoding a bit stream encoded by the apparatus of FIG. 2.

FIG. 6 is a block diagram of an apparatus for decoding a bit stream encoded by the apparatus of FIG. 2. The decoding apparatus of FIG. 6 includes a demultiplexer (demuxer) 200 for separating a received bit stream into a compressed motion vector stream and a compressed macroblock information stream, a texture decoding unit 210 for reconstructing the compressed macroblock information stream into an original decompressed stream, a motion decoding unit 220 for reconstructing the compressed motion vector stream into an original decompressed stream, an enhanced layer (EL) decoder 230 for performing an inverse transform on the decompressed macroblock information stream and the decompressed motion vector stream using, for example, MCTF, and obtaining the original video signal, and a base layer (BL) decoder 240 for decoding the base layer stream using a predetermined method, for example, MCTF, MPEG-4, or H.264.

The EL decoder 230 performs an inverse update operation on a macroblock in an 'L' frame that has been encoded and input, or has been decoded and generated at a previous temporal level, to determine whether a region of an 'H' frame, which has been predicted on the basis of part or all of a region of the macroblock and has been encoded as an image difference, exists with reference to a reference index and a motion vector, and to subtract the image difference of the determined region from the image value of the macroblock, if necessary. The EL decoder 230 performs the above operation on all macroblocks, in the 'L' frame, thus completing the 'L' frame at a corresponding temporal level.

In this case, the reference index and the motion vector information can be provided by the motion vector decoding unit 220, or can be derived from a base layer based on the information or data, provided by the BL decoder 240, using the method described with reference to FIGS. 3 and 4.

Further, the shape of each sub-block of the macroblock of an enhanced layer, and a motion vector for each sub-block can be obtained on the basis of partitioning information recorded in the header of the macroblock. Alternatively, the shape of each sub-block of the macroblock and the mode and motion vector of each sub-block can be derived from the base layer using the method described with reference to FIG. 5.

Further, the EL decoder 230 performs an inverse-prediction operation on each macroblock in an 'H' frame at an arbitrary temporal level, which has been encoded and input, to determine a reference region in an 'L' frame at a subsequent temporal level that has been generated through the inverse update operation, with reference to the reference index, partitioning information, and the motion vector that are provided by the motion vector decoding unit 220 or are derived from the base layer, and to add the image value of the reference region to the image difference of the macroblock. The EL decoder 230 performs the above operation on all macroblocks in the 'H' frame, thus completing an 'L' frame at the subsequent temporal level. The completed 'L' frame is inversely updated, so the inversely updated 'L' frame and the completed 'L' frame are alternately arranged.

According to the above-described method, the encoded data stream is reconstructed into a complete video frame sequence. In particular, when a prediction operation and an update operation are performed N times (N temporal decomposition levels) on a single GOP during an encoding procedure described using the MCTF method as an example, image quality corresponding to that of the original video signal can be obtained if an inverse update operation and an inverse prediction operation are performed N times during the MCTF decoding procedure. If the inverse update operation and the inverse prediction operation are performed a number of times less than N, image quality may be slightly deteriorated, but a video frame sequence having a lower bit rate can be obtained. Therefore, the decoding apparatus is designed to perform an inverse update operation and an inverse prediction operation to a degree suitable to the desired performance thereof.

The above decoding apparatus can be mounted in a mobile communication terminal or a device for reproducing a recording medium.

Therefore, the present invention can derive partitioning information, reference index information or motion vector information from a base layer, in particular, can derive motion information, etc. from a base layer that causes the ratio of the screen sizes of an enhanced layer to the base layer to be a value which is not a multiple of 2, thus improving coding efficiency.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for decoding a video signal performed by a video decoding system, comprising:

deriving, with the video decoding system, a corresponding pixel value of a corresponding block in a base layer from the video signal, the corresponding block being referred by a current block in an enhanced layer, wherein the base layer represents an up-sampled base layer, and a spatial resolution of the up-sampled base layer corresponds to a spatial resolution of the enhanced layer;

obtaining, with the video decoding system, a pixel prediction value of the current block from the corresponding pixel value; and reconstructing, with the video decoding system, the current block based on the pixel prediction value of the current block and a residual value, wherein a block type of the corresponding block is intra mode, and the residual value represents a difference value between the pixel prediction value of the current block and a pixel value of the current block.

2. An apparatus for decoding a video signal, comprising:
an enhanced layer decoder deriving a corresponding pixel value of a corresponding block in a base layer from the video signal, the corresponding block being referred by a current block in an enhanced layer,
the enhanced layer decoder obtaining a pixel prediction value of a current block from the corresponding pixel value, and
the enhanced layer decoder reconstructing the current block based on the pixel prediction value of the current block and a residual value,
wherein the base layer represents an up-sampled base layer, a spatial resolution of the up-sampled base layer corresponds to a spatial resolution of the enhanced layer, a block type of the corresponding block is intra mode,
and the residual value represents a difference value between the pixel prediction value and the pixel value of the current block.

\* \* \* \* \*

UNITED STATES PATENT AND TRADEMARK OFFICE
CERTIFICATE OF CORRECTION

| | | |
|---|---|---|
| PATENT NO. | : 7,899,115 B2 | Page 1 of 1 |
| APPLICATION NO. | : 11/918441 | |
| DATED | : March 1, 2011 | |
| INVENTOR(S) | : Byeong Moon Jeon et al. | |

It is certified that error appears in the above-identified patent and that said Letters Patent is hereby corrected as shown below:

Please add the following paragraph to the beginning of the Specification Col. 1, Ln 3, This U.S. nonprovisional application claims priority to PCT Application No. PCT/KR2006/001388, filed on April 14, 2006, which claims priority to U.S. Provisional Application No. 60/671,495, filed on April 15, 2005, the disclosure of each of which is incorporated herein in its entirety by reference.

Signed and Sealed this
Twentieth Day of September, 2011

David J. Kappos
*Director of the United States Patent and Trademark Office*